(12) United States Patent
Kahlon et al.

(10) Patent No.: US 8,769,499 B2
(45) Date of Patent: Jul. 1, 2014

(54) UNIVERSAL CAUSALITY GRAPHS FOR BUG DETECTION IN CONCURRENT PROGRAMS

(75) Inventors: Vineet Kahlon, Princeton, NJ (US); Chao Wang, Plainsboro, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 925 days.

(21) Appl. No.: 12/907,409

(22) Filed: Oct. 19, 2010

(65) Prior Publication Data

US 2011/0167412 A1 Jul. 7, 2011

Related U.S. Application Data

(60) Provisional application No. 61/292,604, filed on Jan. 6, 2010.

(51) Int. Cl.
*G06F 9/44* (2006.01)
*G06F 11/00* (2006.01)
*G06F 9/45* (2006.01)

(52) U.S. Cl.
USPC ............. 717/126; 714/38.1; 717/132; 703/22

(58) Field of Classification Search
USPC .......................................................... 717/130
See application file for complete search history.

(56) References Cited

U.S. PATENT DOCUMENTS

| | | | |
|---|---|---|---|
| 6,779,135 B1* | 8/2004 | Ur et al. ..................... | 714/38.13 |
| 2006/0212759 A1* | 9/2006 | Campbell et al. ............ | 714/38 |
| 2007/0168988 A1* | 7/2007 | Eisner et al. ................. | 717/126 |
| 2009/0125887 A1* | 5/2009 | Kahlon et al. ................ | 717/126 |
| 2009/0193417 A1* | 7/2009 | Kahlon ......................... | 718/100 |
| 2009/0204968 A1* | 8/2009 | Kahlon et al. ................ | 718/100 |
| 2009/0328045 A1* | 12/2009 | Burckhardt et al. .......... | 718/102 |
| 2011/0131550 A1* | 6/2011 | Burckhardt et al. .......... | 717/124 |

OTHER PUBLICATIONS

Farzan, A., et al. "Meta-Analysis for Atomicity Violations Under Nested Locking" Computer Aided Verification, 21st International Conference, CAV 2009. Jun.-Jul. 2009. pp. 1-15.

Flanagan, C., et al. "A Type and Effect System for Atomicity" Proceedings of the ACM SIGPLAN 2003 Conference on Programming Language Design and Implementation 2003. PLDI'03. Jun. 2003. (12 Pages).

Flanagan, C., et al. "Atomizer: A Dynamic Atomicity Checker for Multithreaded Programs" The 31st Annual Symposium on Principles of Programming Languages. POPL'04. Jan. 2004. (12 Pages).

Serbanuta, T., et al. "Maximal Causal Models for Multithreaded Systems" Technical Report UIUCDCS-R-2008-3017. Dec. 2008. pp. 1-25.

Wang, C., et al. "Trace-Based Symbolic Analysis for Atomicity Violations" Tools and Algorithms for the Construction and Analysis of Systems, 16th International Conference, TACAS 2010. Mar. 2010. (16 Pages).

* cited by examiner

*Primary Examiner* — Ryan Coyer
(74) *Attorney, Agent, or Firm* — Joseph Kolodka

(57) ABSTRACT

A system and method for predictive analysis includes generating an execution trace on an instrumented version of source code for a multithreaded computer program. Interleavings which potentially lead to a violation in the program are statically generated by performing a static predictive analysis using a Universal Causality Graph (UCG) to generate alternative interleavings that might lead to an error. The UCG includes a unified happens-before model for the concurrent program and a property being analyzed. The interleavings are symbolically checked to determine errors in the program.

11 Claims, 4 Drawing Sheets

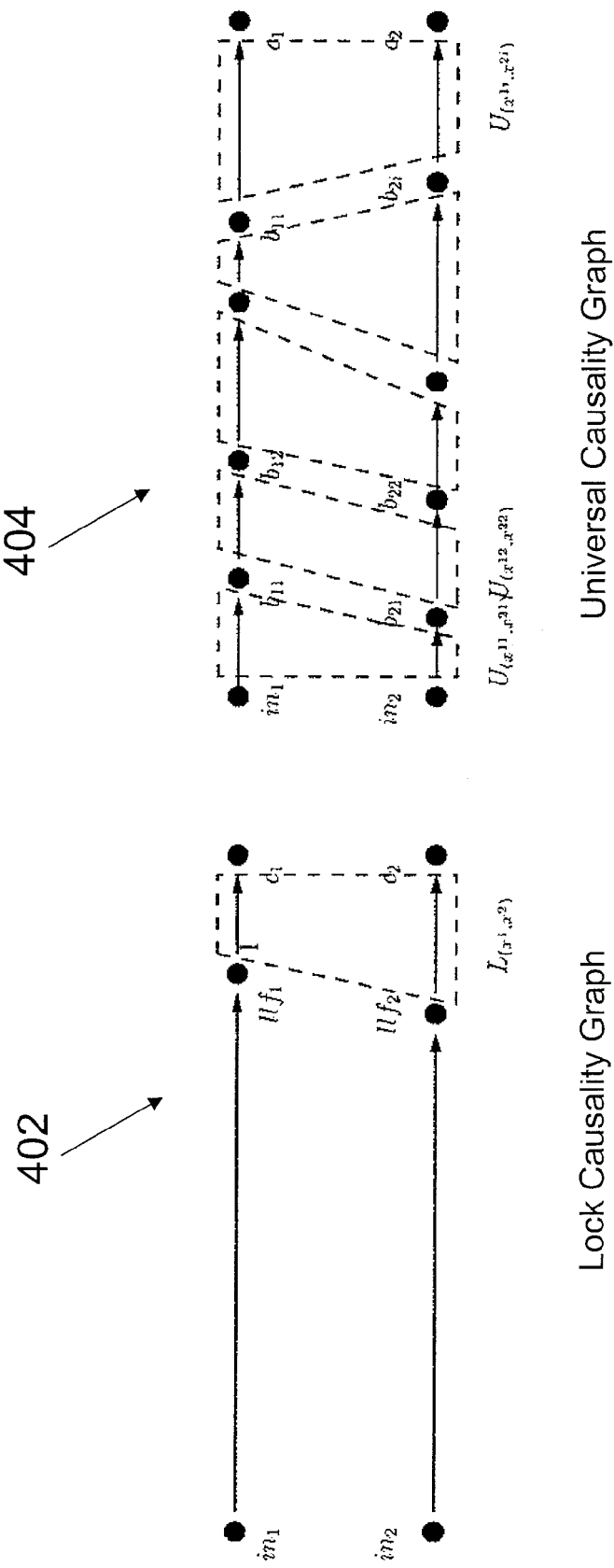

UNIVERSAL CAUSALITY GRAPHS FOR BUG DETECTION IN CONCURRENT PROGRAMS

RELATED APPLICATION INFORMATION

This application claims priority to provisional application Ser. No. 61/292,604 filed on Jan. 6, 2010, incorporated herein by reference.

BACKGROUND

1. Technical Field

The present invention relates to computer program checking and more particularly to a system and method for analyzing a concurrent program with predictive analysis which employs a Universal Causality Graph (UCG).

2. Description of the Related Art

Predictive analysis aims at detecting concurrency errors such as atomicity violations by analyzing a concrete execution trace (which itself may be non-erroneous). In its most general form, predictive analysis has three main steps: 1) Run a test of the concurrent program to obtain an execution trace. 2) Run a sound but over-approximate algorithm, typically involving statically analyzing the given trace, to detect all potential violations, e.g., data races, deadlocks, atomicity violations, etc. If no violation is found, return. 3) Build the precise predictive model, and for each potential violation, check whether it is feasible. If it is feasible, create a concrete and replayable witness trace. This check is typically formulated as a satisfiability problem, by constructing a formula which is satisfiable if there exists a feasible trace that exposes a potential error.

In this framework, step 2, i.e., a static enumeration of the set of interleavings that may potentially lead to a concurrency violation, occupies a key role in determining scalability as well as precision of the overall procedure.

Existing predictive analysis algorithms can be classified into the following categories: 1) Methods that do not miss real errors but may report bogus errors. These methods are based on over approximated modeling of the execution trace. Representatives are based on causal atomicity, and based on type-for-atomicity. 2) Methods that do not report bogus errors but may miss some real errors. These methods are based on under-approximated modeling. Representatives are based on happens-before causality relations. 3) Methods that are both sound and complete but not scalable as they explore too many interleavings.

SUMMARY

A system and method for predictive analysis includes generating an execution trace on an instrumented version of source code for a multithreaded computer program. Interleavings which potentially lead to a violation in the program are statically generated by performing a static predictive analysis using a Universal Causality Graph (UCG) to generate alternative interleavings that might lead to an error. The UCG includes a unified happens-before model for the concurrent program and a property being analyzed. The interleavings are symbolically checked to determine errors in the program.

A system for predictive analysis includes a source code instrumentation module stored on computer readable storage media and configured to generate an instrumented version of source code for a multithreaded computer program. A predictive analysis module is configured to statically generate interleavings which potentially lead to a violation in an execution trace of the program by performing a static predictive analysis using a Universal Causality Graph (UCG) to generate alternative interleavings that might lead to an error, the UCG being a unified happens-before model for the program and a property being analyzed. A symbolic checker checks the interleavings to determine errors in the program.

The present methods are more precise and do not report bogus errors, and provide better coverage, i.e., do not miss real errors for the given test input. The present methods are also more scalable and work on very large programs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a diagram showing a universal causality graph decomposition in accordance with one illustrative embodiment.

DETAILED DESCRIPTION OF PREFERRED EMBODIMENTS

Figure 1:
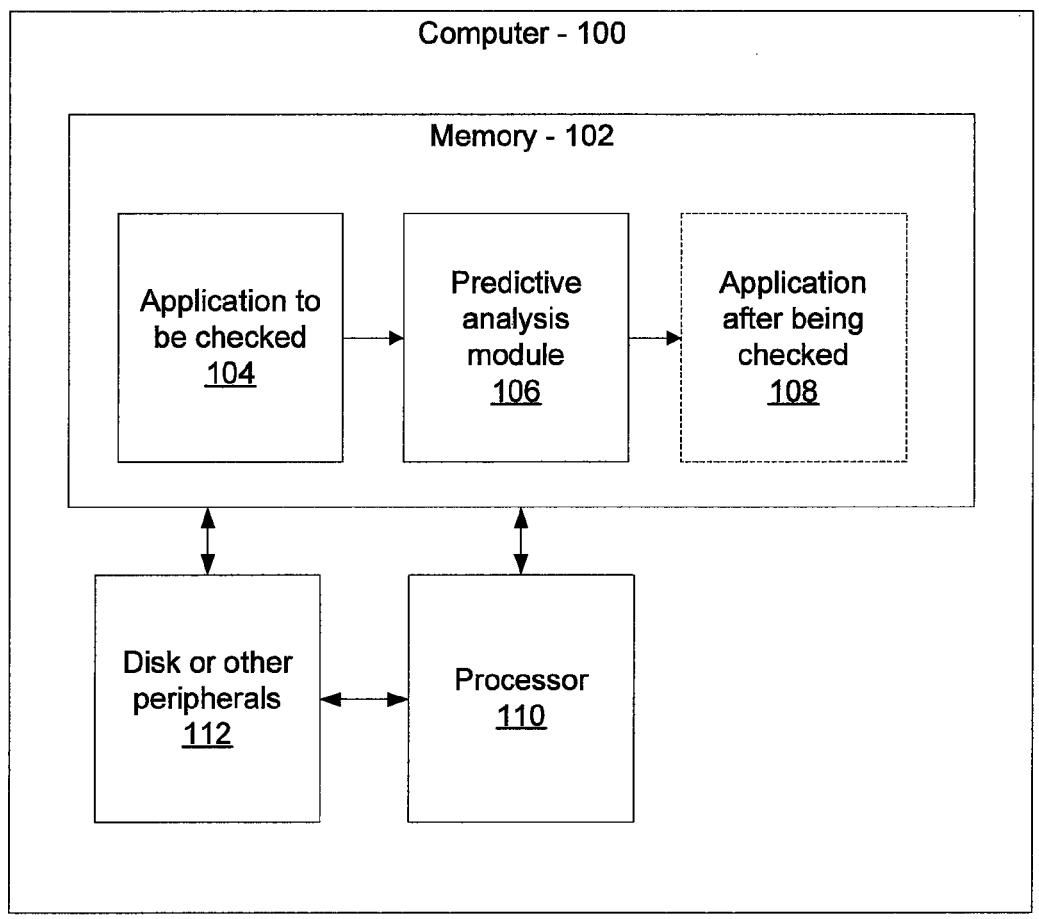
FIG. 1 is a block/flow diagram showing a system for analyzing concurrent programs in accordance with one embodiment.

In accordance with the present principles, a Universal Causality Graph (UCG) is a unified happens-before model for the given concurrent program and a property at hand. UCGs permit capture, as happens-before constraints, of the set of all possible interleavings that are feasible under scheduling constraints imposed by synchronization primitives that may potentially lead to violations of the property at hand.

A predictive analysis in accordance with the present principles is more exact, i.e., sound and complete. All synchronization primitives and the property being checked are considered in a unified manner. Existing techniques consider only programs with nested locks. The predictive analysis is applicable to a broader class of programs since no restrictions are placed on the set of synchronization primitives used whereas existing techniques either use only nested locks or use under-approximation. The predictive analysis is also more scalable than existing techniques. Applying the present methods in the development of multithreaded applications can improve programmer productivity and software product quality, and can reduce development costs by finding bugs early and cheaply.

In one embodiment, a predictive analysis based bug detector is provided. Given a multithreaded program and a user provided test input, a source code is instrumented and tested to produce an execution trace. Based on the given execution trace, a static predictive analysis is applied using a Universal Causality Graph to generate alternative inter-leavings that might lead to an error. Then, symbolic analysis is used to check whether any alternative trace has a bug. The Universal Causality Graphs generate alternative schedules that might lead to an error. For a special case of predictive analysis, we provide an efficient construction for the Universal Causality Graph. The Universal Causality Graph is employed to capture all the feasible permutations of symbolic events in the given execution trace. The Universal Causality Graph is used to statically generate all possible interleavings that might lead to an error state that works for all the standard synchronization primitives (locks, condition variables, etc.) as well as the property at hand.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a high level block diagram shows a system/method for checking a program for bugs. A computer system or device 100 and its components may include functions or modules which are distributed or spread across networks. The computer device 100 includes memory 102 and a processor 110. Other peripherals and interface devices, such as a disk drive, a keyboard, a mouse, etc. may also be included. An application or program 104 to be analyzed that may include bugs is stored in memory 102. The program 104 may include a multi-threaded concurrent program. A predictive analysis based bug detector module 106 is employed to analyze the program 104 in accordance with the present principles. The module 106 makes use of a Universal Causality Graph (UCG) which is a unified happens-before model for the given concurrent program 104 or a property at hand that is being analyzed. The UCG captures a set of all possible interleavings that are feasible under scheduling constraints imposed by synchronization primitives that may potentially lead to violations of the property at hand. The set of all possible interleavings are captured as happens-before constraints. The predictive analysis performed by module 106 is more accurate and complete than existing static predictive analysis techniques as module 106 considers, in a unified manner, all synchronization primitives as well as the property being checked. No restrictions are placed on the set of synchronization primitives used and greater scalability is provided. Applying the module 106 in developing multithreaded applications improves productivity and software product quality, and can reduce development costs by a more efficient determination of bugs. The module 106 outputs an application or a bug-free program 108.

Figure 2:
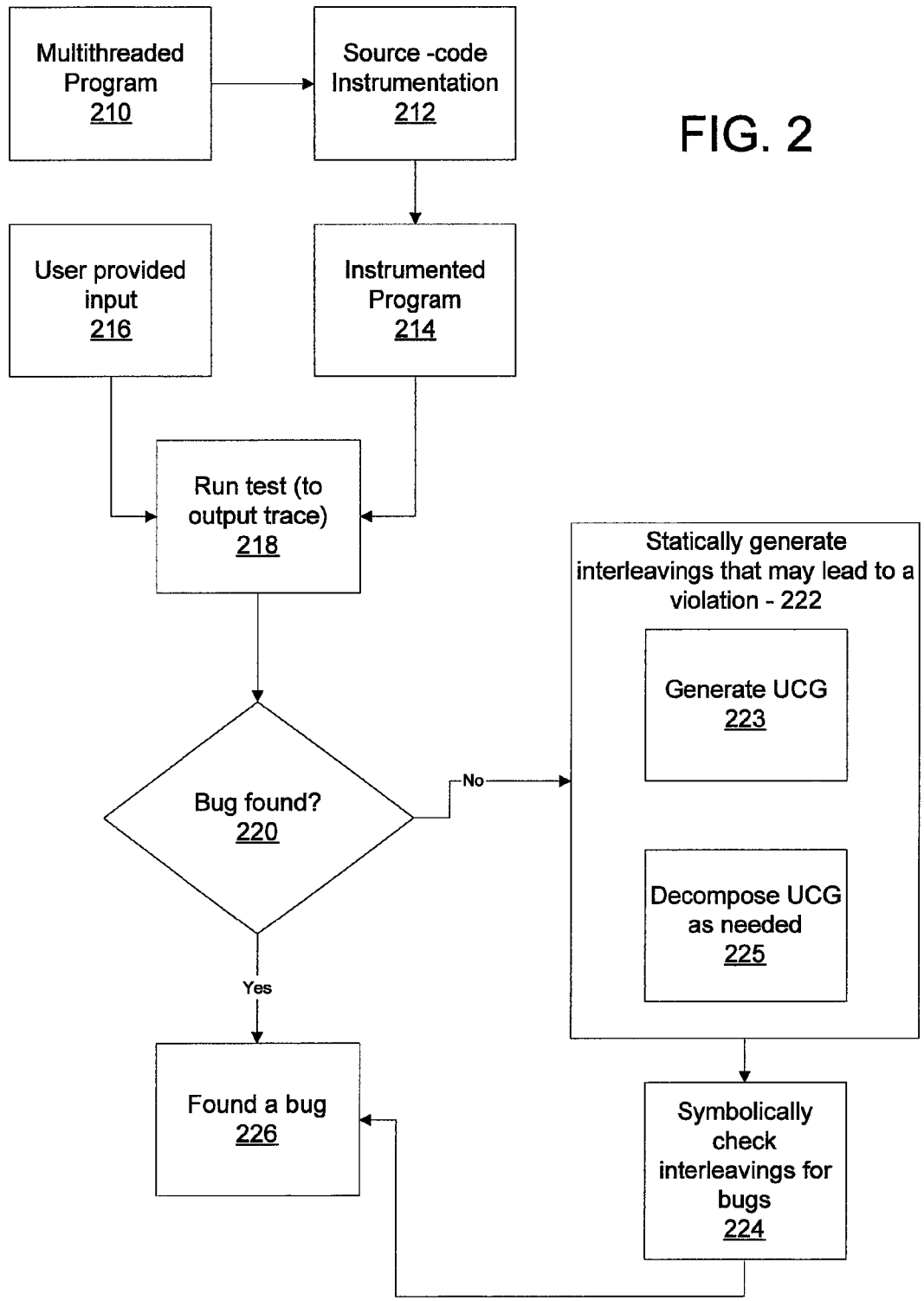
FIG. 2 is a block/flow diagram for performing predictive analysis in accordance with one embodiment.

Referring to FIG. 2, the predictive analysis based bug detector module 106 of FIG. 1 is shown in greater detail. A multithreaded program 210 (e.g., application 102) is provided to a source code instrumentation module 212. The instrumentation module 212 instruments the program to provide an instrumented program 214 for analysis and to produce an execution trace when run. A user provided test input 216, which may include a property to be checked or other information for running a test. In block 218, a test is run once to produce an execution trace. A determination is made in block 220 as to whether a bug is found. The given execution trace is assumed not erroneous; otherwise we have found the bug in block 226. Based on the given execution trace, a static predictive analysis is applied in block 222 using a Universal Causality Graph, created in block 223, to generate alternative interleavings that might lead to an error. Then, in block 224, we use a symbolic analysis method to check whether any alternative trace has a bug (226). In block 225, the Universal Causality Graph may be decomposed to analyze smaller segments to enable additional scalability.

Triggering errors in a concurrent program is a notoriously difficult task. A key reason for this is the behavioral complexity resulting from the large number of interleavings of transitions of different threads. To scale concurrent program analysis, efficient static techniques are often employed to restrict, as much as possible, the set of interleavings that need be explored. Specifically, these analyses try to exploit scheduling constraints imposed by synchronization primitives like locks, wait/notify, barriers, etc., to determine whether the property at hand can be violated and propose schedules that may lead to such a violation. Such static techniques play a role in enhancing the scalability of a variety of concurrent program analyses from model checking to runtime analysis. However, these techniques suffer from several drawbacks (i) applicability to a single synchronization primitive, e.g., nested locks, (ii) not guaranteed to be exact. i.e., both sound and complete, (iii) inability to exploit the nature of the property to remove interleavings, and (iv) restricted scalability.

To address these challenges, a notion of a Universal Causality Graph (UCG) is provided in accordance with the present principles such that given a correctness property P, the graph encodes a set of all (statically) feasible interleavings that may violate P. UCGs provide a unified happens-between model by reducing scheduling constraints imposed by synchronization primitives as well as causality constraints imposed by the property at hand to causality constraints. It can be shown that by embedding all these constraints into one common model allows us to not only exploit the synergy between constraints imposed by different synchronization primitives like locks and wait/notify but also the synergy between casual constraints imposed by the property and the synchronization primitives. This permits us to filter out more redundant interleavings than would be possible if we considered the different synchronization primitives in isolation, or the primitives in isolation from the property. This also guarantees exactness of the present technique.

The present technique: (i) works for all the standard synchronization primitives, (ii) is exact, (iii) exploits causality constraints induced by the primitives as well as the property, and (iv) is scalable for predictive analysis, among other things. As an application, we demonstrate the use of UCGs in enhancing the scalability of predictive analysis in the context of runtime verification of concurrent programs.

Triggering errors in concurrent programs is difficult due to the behavioral complexity resulting from the large number of interleavings of transitions of different threads. This leads to the state-explosion problem thereby rendering a full-fledged exploration of the state space of the concurrent program at hand infeasible. As a result runtime error detection techniques have been gaining in popularity in recent years. Runtime monitoring aims at identifying atomicity violations exposed by a given execution trace. However, due to the large number of possible interleavings it is a challenging task during testing to trigger the erroneous thread schedule in the first place. In contrast, runtime prediction aims at detecting atomicity violations in all feasible interleavings of events of the given trace. In other words, even if no violation exists in that trace, but an alternative interleaving is erroneous, a predictive method may be able to catch it without actually re-running the test.

Predictive analysis offers a compromise between runtime monitoring and full-fledged analysis and avoids the state explosion problem inherent in model checking by restricting the analysis to a single execution trace or different interleavings that can be generated from that trace and that are feasible to expose errors. In its most general form, predictive analysis has three main steps: 1) Run a test of the concurrent program to obtain an execution trace. 2) Run a sound but over-approximate algorithm, typically involving statically analyzing the given trace, to detect all potential violations. e.g., data races, deadlocks, atomicity violations, etc. If no violation is found, return. 3) Build the precise predictive model and for each potential violation, check whether it is feasible. If it is feasible, create a concrete and replayable witness trace. This check is typically formulated as a satisfiability problem, by constructing a formula which is satisfiable if there exists a feasible trace that expose a potential error. The main bottleneck in scalability of the above framework is the satisfiability procedure in step 3. In the interest of scalability some techniques, avoid step 3 altogether.

To sum up, irrespective of the predictive analysis methodology being used, step 2, i.e., a static enumeration of the set of interleavings that may potentially lead to a concurrency violation, occupies a key role in determining scalability as well as precision of the overall procedure. That state-of-the-art in using static analysis for predictive analysis suffers from several drawbacks. To generate feasible interleavings via static analysis, existing techniques exploit the use of acquisition histories for concurrent programs with threads interacting via nested locks. However, these techniques are not applicable to concurrent programs that use non-nested locks or use wait/notify-style primitives in conjunction with locks which is very common in Java™ programs. Since the traces are finite one could, in principle, always model check the traces by ignoring data. However, even though the traces are of finite lengths they could be arbitrarily long making such a procedure computationally expensive. Thus, we need static predictive analysis techniques that are scalable and work for a broad class of synchronization primitives used in real-life programs.

Static schedule generation for standard concurrency errors like data races, deadlocks and atomicity violations first isolates a set of potential locations where these errors could occur and then constructs a set of interleavings leading to these locations that respect scheduling constraints imposed by synchronization primitives. However, the existence of each of these standard concurrency errors can be expressed as happens-before constraints. These happens-before constraints in combination with scheduling constraints imposed by synchronization primitives often induce happens-before causal constraints that can then be exploited to weed out more interleavings than can be accomplished via existing techniques.

In accordance with the present principles, a Universal Causality Graph (UCG) is provided which is a unified happens-before model for the given concurrent program as well as the property at hand that addresses the above challenges. UCGs allow us to capture, as happens-before constraints, the set of all possible interleaving that are feasible under the scheduling constraints imposed by synchronization primitives that may potentially lead to violations of the property at hand.

With a finite pair of computations $x^1$ and $x^2$ of two threads, we associate a UCG $U_{(x^1,x^2)}$ which is a directed bipartite graph whose vertices are a subset of the set of synchronization events occurring along $x^1$ and $x^2$ and each edge of $U_{(x^1,x^2)}$ of the form $e_1 Y e_2$ represents a happens-before constraint, i.e., $e_1$ must be executed before $e_2$. Thus, $U_{(x^1,x^2)}$ represents the set of all interleavings of $x^1$ and $x^2$ that satisfy all the happens before constraints representing all the edges of $U_{(x^1,x^2)}$. UCGs have the following desirable properties:

Soundness and Completeness:

Given a property, $U_{(x^1,x^2)}$ captures those and only those interleavings of $x^1$ and $x^2$ that satisfy (i) scheduling constraints imposed by synchronization primitives like locks and wait/notify statements, (ii) happens before constraints imposed by fork join statements, and (iii) the given property. This gives us an exact, i.e., sound and complete, technique for static generation of feasible interleavings satisfying the given property.

Universality:

UCGs can handle, in a scalable fashion, all the standard synchronization primitives unlike existing techniques which can handle only threads with nested locks.

Scalability:

A reason for this is that UCGs incorporate only those causality constraints between synchronization events that impact the occurrence of a property violation with the other synchronization events being ignored. This is an important aspect to the scalability of the overall analysis. Indeed, since the initial traces could be arbitrarily long, incorporating all the synchronization events in $U_{(x^1,x^2)}$ would make the analysis infeasible. However, the UCG keeps track of happens-before constraints induced by suffixes of $x^1$ and $x^2$ starting at the last lock-free state. Such suffixes are usually small. Note that the UCG construction guarantees both soundness and completeness even though it tracks constraints arising from suffixes of $x^1$ and $x^2$ of a small length.

Unified View of Property and Program:

UCGs encode both the property induced casual constraints and the scheduling constraints imposed by synchronization primitives in terms of happen-before constraints. This enables us to build a unified happens-before model which is not only elegant but enables us to blend both property and program induced causality constraints. This synergy permits us to deduce more causal constraints then would otherwise be possible. These constraints are needed to guarantee both soundness and completeness of our method.

Referring again to FIG. 2, a concurrent program 210 has a set of threads and a set SV of shared variables. Each thread $T_i$, where $1 \leq i \leq k$, has a set of local variables $LV_i$. Let Tid= $\{1, \ldots, k\}$ be the set of thread indices, and let $V_i = SV \cup LV_i$, where $1 \leq i \leq k$, be the set of variables accessible in $T_i$. The remaining aspects of a concurrent program are left unspecified, to apply more generally to different programming languages. An execution trace is a sequence of events $\rho = t_1 \ldots t_n$. An event $t \in \rho$ is a tuple $\langle tid, action \rangle$, where $tid \in Tid$ and action is a computation of the form (assume(c), asgn), i.e. a guarded assignment, where asgn is a set of assignments, each of the form v:=exp, where $v \in V_i$ is a variable and exp is an expression over $V_i$ and assume(c) means the conditional expression c over $V_i$ must be true for the assignments in asgn to execute.

Each event t in $\rho$ is a unique execution instance of a statement in the program. If a statement in the textual representation of the program is executed multiple times, e.g., in a loop or a recursive function, each execution instance is modeled as a separate event. By defining the expression syntax suitably, the trace representation can model executions of any multi-threaded program. The guarded assignment action has three variants: (1) when the guard c=true, it models normal assignments in a basic block; (2) when the assignment set asgn, is empty, assume(c) models the execution of a branching statement if(c); and (3) with both the guard and the assignment set, it can model the atomic check-and-set operation, which is the foundation of all concurrency/synchronization primitives.

Synchronization Primitives.

We use the guarded assignments in our implementation to model all synchronization primitives in POSIX Threads (or PThreads). This includes locks, semaphores, condition variables, barriers, etc. For example, acquire a mutex lock l in the thread T, where $i \in Tid$, which is modeled as event $\langle i, (assume(l=0), \{l:=i\}) \rangle$. Here, 0 means the lock is available and thread index i indicates the owner of the lock. Release of lock/is modeled as $\langle i, (assume(l=i)), \{l:=0\}) \rangle$. Similarly, acquire a counting semaphore cs, which is modeled using (assume(cs>0)), {cs:=cs−1}), while release is modeled using (assume(cs≥0)), {cs:=cs+1}).

Concurrent Trace Programs.

The semantics of an execution trace are defined using a state transition system. Let $V = SV \cup \cup_i LV_i$, $1 \leq i \leq k$, be the set of all program variables and Val be a set of values of variables in V. A state is a map s: V→Val assigning a value to each variable. We also use s[v] and s[exp] to denote the values of $v \in V$ and expression exp in state s. We say that a state transition $s \xrightarrow{t} s'$ exists, where s, s' are states and l is an event in thread $T_i$, $1 \leq i \leq k$, iff $t = \langle i, (assume(c), asgn) \rangle$, s[c] is true, and for each assignment v:=exp in asgn, s'[v]=s[exp] holds; states s and s' agree on all other variables.

Let $\rho = t_1 \ldots t_n$ be an execution trace of a program P. Then, $\rho$ can be viewed as a total order on the set of symbolic events in $\rho$. From $\rho$ one can derive a partial order called the concurrent trace program (CTP).

Definition 1.

The concurrent trace program with respect to $\rho$, denoted $CTP_\rho$, is a partially ordered set (T, β), such that, β
T={t|t∈ρ} is the set of events, and
β is a partial order such that, for any $t_i$, $t_j \in T$, $t_i \beta t_j$ iff tid($t_i$)=tid ($t_j$) and i<j (in $\rho$, event $t_i$ appears before $t_j$).

$CTP_\rho$ orders events from the same thread by their execution order in $\rho$; events from different threads are not explicitly ordered with each other. In the sequel, we will say $t \in CTP_\rho$ to mean that $t \in T$ is associated with the CTP.

We now define feasible linearizations of $CTP_\rho$. Let $\rho' = t'_1 \ldots t'_n$ be a linearization of $CTP_\rho$, i.e., and interleaving of events of $\rho$. We say that $\rho'$ is feasible iff there exists states $s_0, \ldots, s_n$ such that, $s_0$ is the initial state of the program and for all i=1, …, n, there exists a transition $s_{i-1} \xrightarrow{t'_i} s_i$. This definition captures the standard sequential consistency semantics for concurrent programs, where we modeled concurrency primitives such as locks by using auxiliary shared variables.

Causal Models for Feasible Linearizations: We recall that in predictive analysis the given concurrent program is first executed to obtain an execution trace $\rho$. By projecting $\rho$ onto the local states of individual threads one can obtain a CTP, $CTP_\rho$. Then, given a property P, e.g., absence of data races, deadlocks or atomicity violations, the goal of predictive analysis is to find a feasible linearization of $CTP_\rho$, leading to a violation of P.

A naive procedure for deciding whether such a linearization exists would be via model checking, i.e., exploring all possible linearizations of $CTP_\rho$ by encoding it as a satisfiability problem (step 3 as described above). However, as the length of $\rho$ increases this usually becomes a scalability bottleneck. Thus, static predictive analysis is often employed to isolate a (small) set of linearizations of $CTP_\rho$ whose feasibility can then be checked via model checking. Here data is usually ignored and only scheduling constraints enforced by synchronization primitives are taken into account, e.g., the linearization generated is required to be feasible only under the scheduling constraints imposed by synchronization and fork-join primitives.

The state-of-the-art in static predictive analysis involves the use of Lipton's reduction theory or acquisition histories for reasoning about threads with nested locks. Such techniques are used to weed out linearizations that are definitely infeasible. For example, one method reduces the problem of checking (the existence or) atomicity violations to simultaneous reachability under nested locking. Under nested locking, simultaneous reachability can be decided by a compositional analysis based on locksets and acquisition histories. However, current static predictive analysis techniques suffer from not handling standard synchronization operations like non-nested locks, wait/notify, barriers, etc., in a unified and scalable manner. Static predictive analysis techniques also suffer from the program and the property being handled separately in that static analysis is first used to isolate a set of thread locations where violations can occur. Then, a second static analysis is used to enumerate a set of linearizations that could potentially reach these locations thereby exposing the violations. This separation of program and property prevents exploitation of the synergy between causality constraints imposed by properties and those imposed by synchronization primitives in the program. This not only leads to the exploration of more linearizations of $CTP_\rho$ than are necessary but causes such techniques to loose exactness, e.g., they are sound but not guaranteed complete.

A Universal Causality Graph captures precisely the set of feasible interleavings of $CTP_\rho$ that may lead to violations while guaranteeing soundness, completeness, and scalability of the resulting static predictive analysis. Additionally, unlike existing techniques, UCGs allow us to not only unify causal constraints imposed by different synchronization primitives but also causal constraints imposed by the program and the property at hand via a happens-before model.

Given a pair of local computations $x^1$ and $x^2$ and a standard property P like an assertion violation or the presence of a data race, a deadlock or an atomicity violation, we construct a causality graph $U_{(x^1, x^2)}(P)$ such that there exists an interleaving of $x^1$ and $x^2$ satisfying P if and only if $U_{(x^1, x^2)}(P)$ is acyclic. We express both the occurrence of P as well as scheduling constraints imposed by synchronization primitives in terms of happens-before constraints leading to a unified model for the given program (trace) as well as property. We start by showing how to express the occurrence of a property violation as a set of happens-before constraints.

Properties As Causality Constraints: We consider two standard concurrency violations: (i) atomicity violations, and (ii) data races, with deadlocks being handled in a similar fashion. Assertion violations reduce to simple reachability of the control location where the assert statement is located and thus require no causality constraint.

Atomicity Violations.

A three-access atomicity violation involves an event sequence $t_c \ldots t_r \ldots t_{c'}$ such that: $t_c$ and $t_{c'}$ are in a transactional block of one thread, and $t_r$ is in another thread; $t_c$ and $t_r$ are data dependent: and $t_r$ and $t_{c'}$ are data dependent. Depending on whether each event is a read or write, there are eight combinations of the triplet $t_c$, $t_r$, $t_{c'}$. While R-R-R, R-R-W, and W-R-R are serializable, the remaining five may indicate atomicity violations.

Given the $CTP_\rho$ and a transaction trans=$t_i \ldots t_j$, where $t_i \ldots t_j$ are events from a thread in $\rho$, we use the set PAV to denote all these potential atomicity violations. Conceptually, the set PAV can be computed by scanning the trace $\rho$ once, and for each remote event $t_r \in CTP_\rho$. Ending the two local events $t_c$, $t_{c'} \in$ trans such that $\langle t_c, t_r, t_{c'} \rangle$ forms a non-serializable pattern. Such an atomicity violation can easily be captured as the two happens-before constraints $t_c Y t_r$ and $t_r Y t_{c'}$ in the universal causality graph, where for events a and b, aYb indicates that a must happen before b.

Data Races.

A data race occurs if there exists events $t_a$ and $t_b$ of two different threads such that a common shared variable is accessed by $t_a$ and $t_b$ with at least one of the accesses being a write operation, and there exists a reachable (global) state of the concurrent program in which both $t_a$ and $t_b$ are enabled. To express the occurrence of a data race involving $t_a$ and $t_b$, we introduce the two happens-before constraints $t_{a'} Y t_b$ and $t_{b'} Y t_a$, in the universal causality graph, where $t_{a'}$ and $t_{b'}$ are the events immediately preceding $t_a$ and $t_b$ in their respective threads. Note that given an execution trace, $t_{a'}$ and $t_{b'}$ are defined uniquely.

Figure 3:
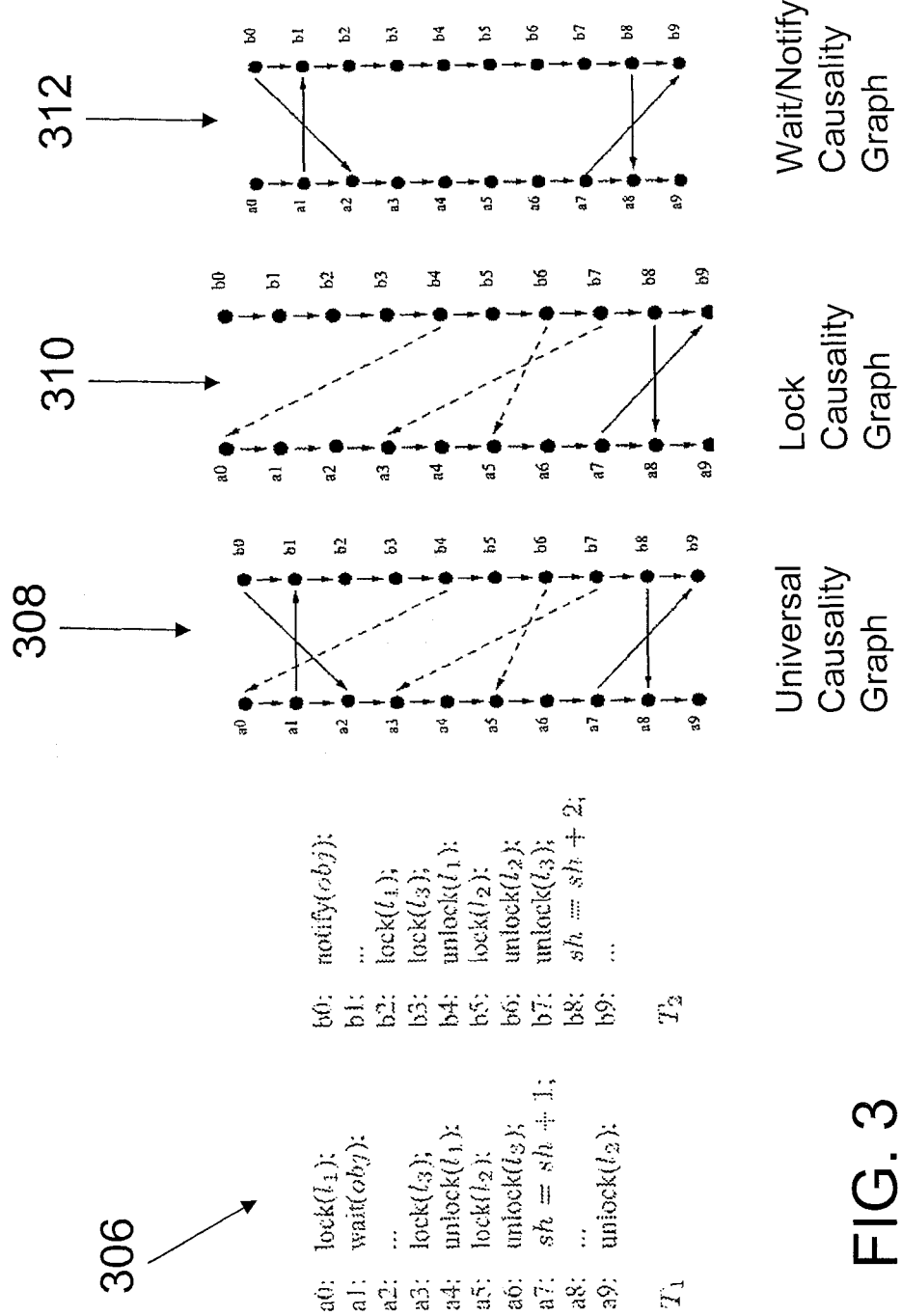
FIG. 3 shows program code and a universal causality graph corresponding to the program in accordance with one illustrative embodiment.

Referring to FIG. 3, Universal Causality Graph Construction is illustratively depicted. We motivate the concept of a causality graph via an example CTP comprised of local traces $x^1$ and $x^2$ of threads $T_1$ and $T_2$, respectively, shown in FIG. 3. FIG. 3 shows an example program 306 with a two thread case; however, the construction works unchanged for multiple threads. In the context of predictive analysis, these local traces are obtained by projecting an original global execution trace (from block 218 of FIG. 2) into the local states of the two threads. Suppose that we are interested in deciding whether a7 and b8 constitute a data race. Note that since the set of locks held at a7 and b8 are disjoint, this pair of locations constitutes a potential data race. Furthermore, since the traces use wait/notify statements as well as non-nested locks, we cannot use existing techniques for reasoning about pairwise reachability of a7 and b8.

As discussed above, for the race to occur there must exist an interleaving of the two local paths $x^1$ and $x^2$ that satisfies the causality constraints a7Yb9 and b8Ya8. For such an interleaving to be valid, the locks along the two local traces must be acquired in a consistent fashion and causality relations imposed by wait/notify statements must be respected.

Using a UCG 308, we now show that the causality constraints generated by the property P at hand, i.e., a possible data race involving a7 and b8, as well as constraints imposed by locks and wait/notify statements, on the order in which statements along $x^1$ and $x^2$ need to be executed to expose the data race, can be captured in a unified manner via happens-before constraints. The nodes of the UCG 308, which we denote by $U_{(x^1,x^2)}(P)$, are the potential violation (in our case data race) sites and the relevant synchronization statements fired along $x^1$ and $x^2$. For statements $c_1$ and $c_2$ of $U_{(x^1,x^2)}(P)$, there exists an edge from $c_1$ to $c_2$, denoted by $c_1 Y c_2$, if $c_1$ must be executed before $c_2$ in order for $T_1$ and $T_2$ to simultaneously reach a7 and b8. UCG $U_{(x^1,x^2)}$ has two types of edges (i) Seed edges and (ii) Induced edges.

Seed Edges:

Seed edges, which are shown as bold solid edges in the UCG 308 in FIG. 3 can be further classified as Property, Synchronization and Fork-Join seed edges. Property Seed Edges: Standard concurrency properties induce causality edges. In our example, the potential data race at the pair of locations a7 and b8 introduce the causality edges a7Yb9 and b8Ya8 that we refer to as the property seed edges.

Synchronization Seed Edges:

Synchronization seed edges are induced by the various synchronization primitives like wait/notifies, barriers, etc. For simplicity, we restrict ourselves to wait/notify primitives. Edges induced by locks are discussed later.

Wait/Notify Seed Edges:

We say that a pair of wait/notify statements in two threads are matching if they access a common object and there exists a reachable global state in which both are enabled. Two matching wait and notify transitions $a_1 \to b_1$ and $a_2 \to b_2$, respectively, induce the causality constraints that (i) all states executed prior to $a_1$ must be executed before all states executed after $b_2$, and (ii) all states executed prior to $a_2$ must be executed before all states executed after $b_1$. In our example, assuming that the statements a1 and b0 are matching, results in the introduction of the causality constraints a1Yb1 and b0Ya2 in the universal causality graph.

Fork-Join Causality Edges:

Matching fork/join operations introduce the causality constraints that all operations of the function executed in the fork call must be executed after all the operations of the forking thread executed before the fork operation and before all operations of the forking thread executed after the matching join operation. Thus, we introduce two edges: the first one from the fork operation to the first statement of the function being forked and the second from the last statement in the function being forked to the matching join operation. The interaction of locks and seed causality edges can be used to deduce further causality constraints that are captured as induced edges (shown as dashed edges in the UCG 308 in FIG. 3). These induced edges are needed in guaranteeing both soundness as well as completeness of our procedure.

Induced Edges:

Consider the causality constraint b8Ya8. From this we can deduce the new causality constraint b6Ya5. Towards that end, we observe that at location a8, lock $l_2$ is held which was acquired at a5. Also, once $l_2$ is acquired at a5, it is not released until after $T_2$ exits a9. Furthermore, we observe that b5 is the last statement to acquire $l_2$ before b8 and b6 is its matching release. Then from the causality constraint b8Ya8 and the local constraint b6Ya5 one can deduce, via transitivity, that b6Ya8. Moreover, from mutual exclusion constraints imposed by lock $l_2$, we have that since $l_2$ is held at a8, it must first be released by $T_2$ before $T_1$ can acquire it via a5 without which a8 cannot be executed. Thus, a5 must be executed after b6, i.e., b6Ya5. From b6Ya5 one can, in turn, deduce that b7Ya3. This is because the last statement to acquire $l_3$ before b6 is b3 and its matching release is b7. Then, using a similar argument as the one above, from the causality constraint b6Ya5 and the mutual exclusion constraints imposed by locks $l_3$, we can deduce that $l_3$, which is held at b7, must first be released before $T_1$ can acquire it via a3 which it needs to execute a5, i.e., b7Ya3. In this way, we keep on adding induced edges until a fixpoint is reached, FIG. 3 shows all the induced edges added by starting at the seed edges b8Ya8 and a7Yb9. Similarly it can be seen that the wait/notify seed edges a1Yb1 and b0Ya2 add further induced edges which are not shown for reasons of clarity.

Computing the Universal Causality Graph.

Given a property P and finite local paths $x^1$ and $x^2$ of threads $T_1$ and $T_2$, a procedure, as shown in TABLE 1, to compute $U_{(x^1,x^2)}(P)$, the universal causality graph for paths $x^1$ and $x^2$ with respect to property P, adds the causality constraints one-by-one (seed edges via steps 3-8, and induced edges via steps 9-19 in TABLE 1) until we reach a fixpoint. Throughout the description of TABLE 1, for $i \in [1.2]$, we use i' to denote an integer in [1.2] other than i. Also, steps 20-22, preserve the local causality constraints along $x^1$ and $x^2$.

Necessary and Sufficient Condition for Property Violation.

Since each causality constraint in $U_{(x^1,x^2)}(P)$ is a happens-before constraint, we see that for P to be violated, $U_{(x^1,x^2)}(P)$ has to be acyclic. In fact, it turns out that acyclicity is also a sufficient condition.

Theorem 1.

(Acyclicity). Property P is violated via a (statically) feasible interleaving of local paths $x^1$ and $x^2$ of $T_1$ and $T_2$, respectively, if and only if $U_{(x^1,x^2)}(P)$ is acyclic.

Complexity of the Universal Causality Graph Construction.

In deducing induced edges each existing edge (step 11) need be processed only once. While processing an edge aYb, we have to consider each lock l held at a or b and deduce whether a new edge can be induced via l. Thus, the total time taken is $O(|E||L|)$, where $|E|$ denotes the number of edges added to the UCG and $|L|$ is the number of different locks acquired/released along $x^1$ and $x^2$. Note that in the worst case $|E|$ is $O(|N|^2)$, where $|N|$ is the number of synchronization events occurring along $x^1$ and $x^2$. Constructing the UCG for the entire traces $x^1$ and $x^2$ may be avoided in the context of predictive analysis, and its construction may be restricted to small suffices of $x^1$ and $x^2$ thereby greatly enhancing the scalability of the procedure.

Exploiting Synergy Between Synchronization Primitives.

Existing static techniques for reasoning about property violation/reachability in the presence of multiple synchronization primitives, like locks and wait/notify, consider the scheduling constraints imposed by these primitives separately. A pair of locations $c_1$ and $c_2$ are considered unreachable if they are unreachable either under scheduling constraints imposed by locks or under causality constraints imposed by wait/notify primitives. However, the universal causality graph captures constraints imposed by both locks and wait/notify primitives in a unified manner thereby allowing us to exploit the synergy between different synchronization primitives. Indeed, in the above example, by considering scheduling constraints imposed by locks and wait/notify statements separately, we cannot deduce that a7 and b8 are unreachable. This is because taking into account scheduling constraints imposed only by locks results in the acyclic lock causality graph labeled "Lock Causality Graph 310" shown in FIG. 3. Similarly, if we consider only scheduling constraints imposed by wait/notify primitives then we would build the acyclic wait/notify causality graph labeled "Wait/notify causality Graph 312" shown in FIG. 3 and again we cannot deduce that a7 and b8 are simultaneously unreachable.

To statically prove the infeasibility of the data race, we have to consider the scheduling constraints imposed by both locks and wait/notify. Since in our example the UCG 308 of FIG. 3 has a cycle (a0Ya1Yb1Yb4Ya0), we can deduce that a7 and b8 do not constitute a data race. The universal causality graph captures the interaction between the different synchronization primitives by building a unified view of all the primitives in terms of causality constraints.

TABLE 1

Computing the Universal Causality Graph

1: Input: Property P and local paths $x^1$ and $x^2$ of $T_1$ and $T_2$, respectively.
2: Initialize the vertices and edges of $U_{(x^1,x^2)}(P)$ to θ
3: Introduce causality edges for P (Property Seed Edge)
4: for each pair of locations w and n corresponding to matching wait/notify statements do
5:     if w' and n' are the successor statements of w and n, respectively, then
6:         Add edges wYn' and nYw' to $U_{(x^1,x^2)}(P)$ (Wait/Notify Seed Edge)
7:     end if
8: end for
9: repeat
10:     for each lock l do
11:         for each edge $d_{i'}Yd_i$ of $U_{(x^1,x^2)}(P)$ do
12:             Let $a_{i'}$ be the last statement to acquire l before $d_{i'}$ along $x^{i'}$ and $r_{i'}$ is either the matching release for $a_{i'}$ or $c_{i'}$ in case l is held at $c_{i'}$ and $a_{i'}$ is the last statement to acquire l before $c_{i'}$
13:             Let $r_i$ be the first statement to release l alter $d_i$ along $x^i$ and $a_i$ the matching acquire for $r_i$
14:             if l is held at either $d_i$ or $d_{i'}$ then
15:                 add edge $r_{i'}Ya_i$ to $U_{(x^1,x^2)}(P)$ (Induced Edge)
16:             end if
17:         end for
18: end for
19: until no new statements can be added to $U_{(x^1,x^2)}(P)$
20: for i ∈ [1..2] do
21:     Add edges among all statements of $x^i$ occurring in $U_{(x^1,x^2)}(P)$ to preserve their relative ordering along $x^i$
22: end for Exploiting Synergy Between Program and Property.

Consider the cycle a0Ya1Yb1Yb4Ya0 in $U_{(x^1,x^2)}(P)$. It is comprised of the induced edge b4Y0 and the wait/notify seed edge a1Yb1. The induced edge b4Ya0 was added via the induction sequence b8Ya8, b6Ya5, b7Ya3, b4Ya0 starting at the property seed edge b8Ya8. Thus, to rule out the data race we have to consider the causality constraints induced by the property as well as the synchronization primitives in unison, the universal causality graph exploits the synergy between program and property induced constraints by expressing both via a common happens-before relation. Existing techniques do not consider these constraints in unison and are hence not guaranteed complete.

Decomposition Result: To leverage the UCG for a practically feasible analysis, we have to address the key issue that the number of constraints added to the UCG may be too large. This is because (1) the traces $x^1$ and $x^2$ could be arbitrarily long, and (2) wait/notify statements could span the entire length of these traces. As a result wait/notify seed edges are added along the entire lengths of $x^1$ and $x^2$, and induced edges will also be added along the entire lengths of the traces. Note that if we were reasoning only about threads interacting via locks, then we would be constructing the lock causality graph causality edges only between lock/unlock statements occurring along the suffixes of $x^1$ and $x^2$ starting at the last lock-free states along $x^1$ and $x^2$, respectively. The main reason for this is that lock/unlock statements do not impose happens-before but mutual exclusion constraints. As a result for reachability/property violations in the presence of locks only (some of) the statements starting at the last lock-free states along $x^1$ and $x^2$ matter. In practice, these suffixes of $x^1$ and $x^2$ tend to be small, as for performance reasons programmers tend to keep the lengths of a critical section small. This ensures that the size of the lock causality graph is small thereby ensuring scalability of the overall analysis.

To guarantee scalability of the reachability analysis in the presence of wait/notifies and locks, one goal is to formulate a result analogous to the one for lock causality graphs, i.e., restrict the analysis to only small suffixes of $x^1$ and $x^2$. Towards that end, we start with the following key decomposition result which provides useful insight into the structure of the UCG. The decomposition result states that the given paths $x^1$ and $x^2$ can be broken down into smaller segments $x^{1i}$ and $x^{2i}$ such that $U_{(x^1,x^2)}(P)$ is the union of the universal causality graphs induced by each pair of segments $x^{1i}$ and $x^{2i}$, i.e., $U_{(x^{1i},x^{2i})}(P)$, where the union of two UCGs is simply the union of their nodes and edges.

Theorem 2. (Decomposition Result).

Given a finite pair of local computations $x^1$ and $x^2$, let $x^1=x^{11}x^{12}$ and $x^2=x^{21}x^{22}$ be partitions of $x^1$ and $x^2$, respectively, such that the last states occurring along segments $x^{11}$ and $x^{21}$ are lock-free.

and there does not exist a wait/notify seed edge. a fork-join seed edge or a property seed edge with endpoints along $x^{11}$ and $x^{22}$ or along $x^{21}$ and $x^{12}$.

Then $U_{(x^1,x^2)}(P) = U_{(x^{11},x^{21})}(P) \cup U_{(x^{12},x^{22})}(P)$.

Repeated application of the above result leads to the following partitioning result. Corollary 3. (Partitioning Result). Given a finite pair of local computations $x^1$ and $x^2$ let $x^1 = x^{11} \ldots x^{1i}$ and $x^2 = x^{21} \ldots x^{2i}$ be partitions of $x^1$ and $x^2$, respectively, such that the last states occurring along $x^{1j}$ and $x^{2j}$ are lock-free, and there does not exist a wait/notify edge, a property seed edge or a fork-join seed edge with endpoints in $x^{1j}$ and $x^{2k}$, where $j \neq k$.

Then $U_{(x^1,x^2)}(P) = U_{j \in [1 \ldots i]} U_{(x^{1j},x^{2j})}(P)$.

Referring to FIG. 4, a lock causality graph 402 is generated only by the suffixes of $x^1$ and $x^2$ starting with the last lock free states $llf_1$ and $llf_2$ along $x^1$ and $x^2$, respectively. However, a universal causality 404 is the union of each of the universal causality graph $U_{(x^{1j},x^{2j})}(P)$ generated by the pairs of segments $x^{1j}$ and $x^{2j}$ delineated, respectively, by the causality barriers $b_{1j}$ and $b_{1(j+1)}$, and $b^{2j}$ and $b^{2(j+1)}$ where a causality barrier is as defined below:

Definition (Causality Barrier).

Given a pair $(x^1, x^2)$ of local paths of threads $T_1$ and $T_2$, respectively, where $x^i = x_0^i \ldots x_{n_i}^i$. We say that the pair $(x_{b_1}^1, x_{b_2}^2)$ of local states of $T_1$ and $T_2$ form a causality barrier if (i) $x_{b_1}^1$ and $x_{b_2}^2$ are lock-free, i.e., no lock is held at $x_{b_1}^1$ and $x_{b_2}^2$ and (ii) there does not exist a pair of matching wait/notify; statements $(x_m^1, x_m^2)$, where $m \in [0 \ldots b_1]$ and $m' \in [b_2+1, n_2]$ or $m \in [0 \ldots b_2]$ and $m' \in [b_1+1, n_1]$.

Each seed edge along the traces $x^1$ and $x^2$ gives rise to localized universal causality graphs that are separated by causality barriers and the union of which gives rise to the universal causality graph for the two traces.

Chopping Result for Predictive Analysis: in predictive analysis, we start from a global execution trace x of the given concurrent program, which may not lead to a desired error state. One goal is to decide whether there exists a different valid interleaving of the local computations $x^1$ and $x^2$ of $T_1$ and $T_2$ along x, that may uncover the error. If we were given two arbitrary local computations $y^1$ and $y^2$ of threads $T_1$ and $T_2$, then to decide whether there exists an interleaving of $y^1$ and $y^2$ leading to an error state, we would have to build the complete UCG along the entire length of $y^1$ and $y^2$. However, by exploiting the fact in predictive analysis $x^i$ s are projections of a valid global computation x onto the local states of individual threads, we can show that we need not build the entire UCG $U_{(x^1,x^2)}(P)$ but only the one generated by suffixes $x^{1b}$ and $x^{2b}$ of $x^1$ and $x^2$, respectively starting at the last barrier pair along $x^1$ and $x^2$. This ensures scalability of our analysis as we can, in practice, ignore most synchronization primitives except for the last few. We say that the pair $(x_{b_1}^1, x_{b_2}^2)$ of local states of threads $T_1$ and $T_2$ is a last causality barrier along $x^1$ and $x^2$ if there does not exist another causality barrier $(x_{b'_1}^1, x_{b'_2}^2)$ such that both $x_{b'_1}^1$ and $x_{b'_2}^2$ occur after $x_{b_1}^1$ and $x_{b_2}^2$ along $x^1$ and $x^2$, respectively.

Theorem 4. (Chopping Result).

Let $x^1$ and $x^2$ be local computations of threads $T_1$ and $T_2$ respectively, along a valid global computation x of the given concurrent program. Let $U_{(x^{1b},x^{2b})}(P)$ be the universal causality graph generated by the suffixes $x^{1b}$ and $x^{2b}$ of $x^1$ and $x^2$, respectively, beginning with the last barrier pair $b_1, b_2$ of $(x^1, x^2)$. Then property P is violated via a statically feasible interleaving of $x^1$ and $x^2$ if and only if is acyclic.

Computing a Last Casualty Barrier.

We formulate an efficient procedure in TABLE 2 to identify a last causality barrier $(x_{b_1}^1, x_{b_2}^2)$. Let $c_1$ and $c_2$ be the last local states along $x^1$ and $x^2$, respectively. Starting at location $c_1$, we traverse backwards along $x^1$ until we reach the last lock free state $lf_1$ along $x^1$ before $c_1$. Then, since all the wait/notify statements occurring between $lf_1$ and $c_1$, which we denote by $WN_1$, must be matched along the suffix beginning with $x_{b_2}^2$, starting at $c_2$, we have to traverse backward until we encounter the first lock-free state $lf_2$ such that all the statements in $WN_1$ are matched along the suffix of $x^2$ starting at $lf_2$. However, in traversing backward from $c_2$ to $lf_2$, we may encounter wait/notify statements, denoted by the set $WN_2$, that are not matched along the suffix of $x^1$ starting at $lf_1$. In that case we need to traverse further backwards starting at $lf_1$ until we encounter a lock-free state $lf'_1$ such that all statements in $WN_2$ are matched along the suffix of $x^1$ starting at $lf'_1$. If we do not encounter any new wait/notify statement that is unmatched along the suffix $x_{[lf_2,n_2]}^2$ then we have reached a fixpoint. Else if there exist wait/notify statements occurring along $x_{[lf'_1,lf_1]}^1$ that are unmatched along then the whole procedure is repeated until a fixpoint is reached.

TABLE 2

Computing a Last Causality Barrier

1: Input: A pair of local paths respectively.
2: Let $lf_1$ be the last lock-free state before $c_1$ along $x^1$ and let $WN_1$ be the set of wait/notify statements encountered along the segment $x_{[lf_1,c_1]}^1$ between the local states Iii and $c_1$ along $x^1$
3: Set terminate to false and $lf_2$ to $c_2$
4: while terminate equals false do
5:     Let $lf_2'$ be the last lock-free state before $lf_2'$ along $x^2$ such that each wait/notify statement in $WN_1$ is matched by a statements along the segment $x_{[lf_2,lf_2]}^2$. Let $WN_2$ be the set of wait/notify statements encounters along $x_{[lf_2,lf_2]}^2$.
6:     Let $lf_1'$ be the last lock-free state at or before $lf_1$ along $x^1$ such that each wait/notify statement in $WN_2$ is matched by a statements along the segment $x_{[lf_1',lf_1]}^1$. Let $WN_1'$ be the set of wait/notify statements encounters along $x_{[lf_1',lf_1]}^1$.
7:     if $lf_1'$ equals $lf_1$ then
8:         Set terminated = true and output $(lf_1, lf_2')$ as a last causality barrier
9:     else
10:         Set $WN_1 = WN_1'$, $lf_1 = lf_1'$ and $lf_2 = lf_2'$
11:     end if
12: end while Having described preferred embodiments of systems and methods for universal causality graphs for bug detection in concurrent programs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for predictive analysis, comprising:
generating an execution trace on an instrumented version of source code for a multithreaded computer program stored on computer readable storage media;
statically generating interleavings which lead to a violation in the program by performing a static predictive analysis using a Universal Causality Graph (UCG) to generate alternative interleavings that lead to an error, the UCG being a unified happens-before model for the concurrent program and a property being analyzed;
symbolically checking the interleavings to determine errors in the program; and
decomposing lengths of computations of the UCG into smaller segments, which are lock-free and there does not exist a wait/notify seed edge, a fork join seed edge or a property seed edge with endpoints along the segments,
wherein the UCG is configured to capture, as happens-before constraints, a set of all interleavings that are possible under scheduling constraints imposed by synchronization primitives that lead to violations of the property, and
wherein the Universal Causality Graph incorporates happens-before constraints arising from the concurrent program and a correctness property.

2. The method as recited in claim 1, wherein the static predictive analysis using a Universal Causality Graph (UCG) is performed to isolate locations that violate the correctness property being checked.

3. The method as recited in claim 1, wherein decomposing the UCG increases scalability of the predictive analysis.

4. The method as recited in claim 1, wherein the UCG handles all standard synchronization primitives in threads.

5. A non-transitory computer readable storage medium comprising a computer readable program for predictive analysis, wherein the computer readable program when executed on a computer causes the computer to perform the steps of:
generating an execution trace on an instrumented version of source code for a multithreaded computer program;
statically generating interleavings which lead to a violation in the program by performing a static predictive analysis using a Universal Causality Graph (UCG) to generate alternative interleavings that lead to an error, the UCG being a unified happens-before model for the concurrent program and a property being analyzed;
symbolically checking the interleavings to determine errors in the program; and
decomposing lengths of computations of the UCG into smaller segments, which are lock-free and there does not exist a wait/notify seed edge, a fork join seed edge or a property seed edge with endpoints along the segments,
wherein the UCG is configured to capture, as happens-before constraints, a set of all interleavings that are possible under scheduling constraints imposed by synchronization primitives that lead to violations of the property, and
wherein the Universal Causality Graph incorporates happens-before constraints arising from the concurrent program and a correctness property.

6. The non-transitory computer readable storage medium as recited in claim 5, wherein a static predictive analysis using a Universal Causality Graph (UCG) is performed to isolate locations that violate the correctness property being checked.

7. The non-transitory computer readable storage medium as recited in claim 5, wherein decomposing the UCG increases scalability of the predictive analysis.

8. The non-transitory computer readable storage medium as recited in claim 5, wherein the UCG handles all standard synchronization primitives in threads.

9. A system for predictive analysis, comprising:
a source code instrumentation module stored on non-transitory computer readable storage media and configured to generate an instrumented version of source code for a multithreaded computer program;
a predictive analysis module configured to statically generate interleavings which lead to a violation in an execution trace of the program by performing a static predictive analysis using a Universal Causality Graph (UCG)

to generate alternative interleavings that lead to an error, the UCG being a unified happens-before model for the program and a property being analyzed; and a symbolic checker to check the interleavings to determine errors in the program, wherein lengths of computations of the UCG are decomposable into smaller segments, which are lock-free and do not have a wait/notify seed edge, a fork join seed edge or a property seed edge with endpoints along the segments, wherein the UCG is configured to capture, as happens-before constraints, a set of all interleavings that are possible under scheduling constraints imposed by synchronization primitives that lead to violations of the property, and wherein the Universal Causality Graph incorporates happens-before constraints arising from the concurrent program and a correctness property.

10. The system as recited in claim 9, wherein the decomposable segments increase scalability of the predictive analysis.

11. The system as recited in claim 9, wherein the UCG handles all standard synchronization primitives.

* * * * *